United States Patent
Pakos

[11] Patent Number: 5,868,051
[45] Date of Patent: Feb. 9, 1999

[54] METHOD AND APPARATUS FOR MACHINING WITH A PIVOTING CUTTING TOOL

[75] Inventor: Andrew E. Pakos, Latrobe, Pa.

[73] Assignee: Pakos Group, Latrobe, Pa.

[21] Appl. No.: 919,165

[22] Filed: Aug. 28, 1997

[51] Int. Cl.[6] .................................................. B23B 1/00
[52] U.S. Cl. .................. 82/110; 82/12; 82/111; 82/127; 82/137; 82/158; 407/81; 409/75; 409/76; 409/78; 4709/66; 4709/81
[58] Field of Search .............................. 82/110, 111, 127, 82/131, 137, 158, 12; 470/60, 81; 409/65, 75, 76, 78; 407/81

[56] References Cited

U.S. PATENT DOCUMENTS

| | | |
|---|---|---|
| 412,215 | 10/1889 | Walter . |
| 602,689 | 4/1898 | Reymond et al. . |
| 2,204,441 | 6/1940 | Ogilvie . |
| 2,257,029 | 9/1941 | Zimmermann . |
| 2,381,849 | 8/1945 | Varndell . |
| 2,399,621 | 5/1946 | Bodmer . |
| 2,399,727 | 5/1946 | Eklund . |
| 2,409,464 | 10/1946 | Andresen . |
| 2,482,786 | 9/1949 | Mack . |
| 2,527,397 | 10/1950 | Castelli . |
| 2,709,924 | 6/1955 | Castelli . |
| 2,713,282 | 7/1955 | Burgsmü ller . |
| 3,704,648 | 12/1972 | Burfoot ..................................... 82/110 |
| 3,710,410 | 1/1973 | Andreasen . |
| 3,720,992 | 3/1973 | Hyatt . |
| 3,735,436 | 5/1973 | Louys . |
| 3,774,501 | 11/1973 | Brown et al. . |
| 3,864,774 | 2/1975 | Fohl . |
| 4,023,211 | 5/1977 | Miyagawa . |
| 4,092,884 | 6/1978 | King ........................................... 82/110 |
| 4,097,181 | 6/1978 | Fisher ........................................ 407/81 |
| 4,292,865 | 10/1981 | Liu et al. ................................... 82/158 |
| 4,485,511 | 12/1984 | Urbanic . |
| 4,613,260 | 9/1986 | Hayes et al. . |
| 4,880,340 | 11/1989 | Taki et al. . |
| 5,199,928 | 4/1993 | Gress et al. . |
| 5,221,234 | 6/1993 | Pakos . |
| 5,304,023 | 4/1994 | Toback et al. . |
| 5,417,130 | 5/1995 | Dorsch ........................................ 82/12 |
| 5,492,442 | 2/1996 | Lasner . |
| 5,546,836 | 8/1996 | Choi ......................................... 82/137 |

*Primary Examiner*—Andrea L. Pitts
*Assistant Examiner*—Toan Le
*Attorney, Agent, or Firm*—Nixon & Vanderhye O.C.

[57] ABSTRACT

A method and apparatus has been developed for metal cutting machine using a cutting die tool that pivots as it cuts a metal workpiece. By pivoting the cutting tool, the orientation of the metal surface being cut in the workpiece may be varied along the cutting path. A particular application of the invention is for screw metal cutting machine, e.g., a Swiss-type screw lathe, that cuts screw threads in screw blank rods, such that the threads have a variable cant along the length of the screw. The cutting die tool is mounted in a tool holder that is pivoted by a computer controller in accordance with machining instructions for the screw or other device being machined.

5 Claims, 4 Drawing Sheets

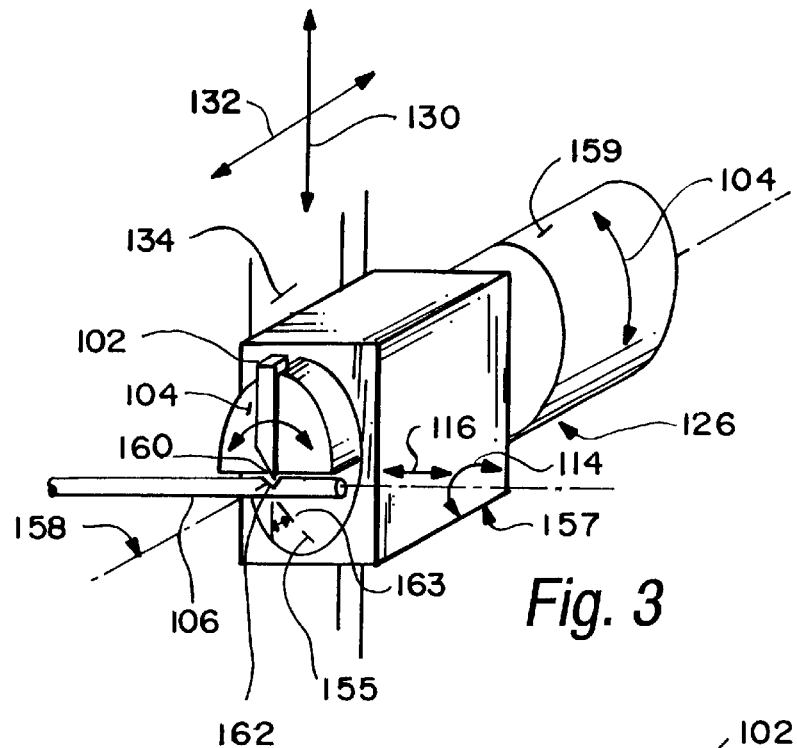
Fig. 3
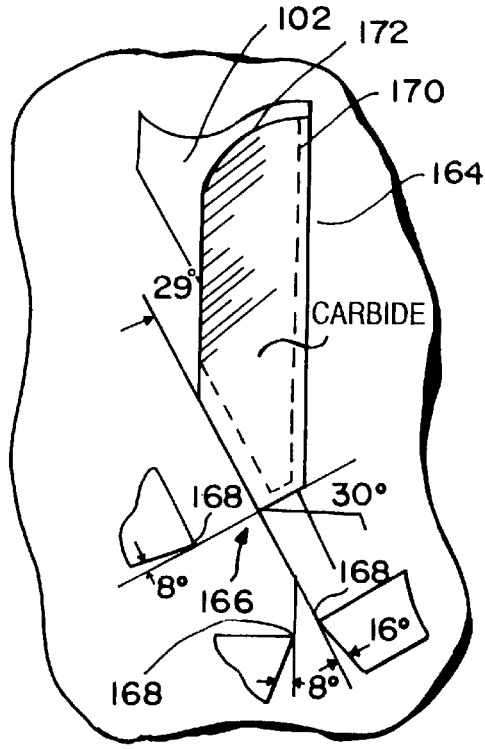
Fig. 4
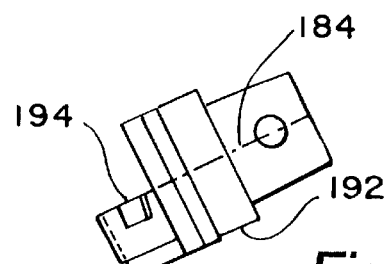
Fig. 5
Fig. 6

METHOD AND APPARATUS FOR MACHINING WITH A PIVOTING CUTTING TOOL

BACKGROUND OF THE INVENTION

1. Field of the Invention

The present invention relates to a method and apparatus for metal machining using a cutting tool die that pivots as it cuts a rotating metal work piece. By pivoting the cutting tool, the orientation of the metal surface being cut in the workpiece may be varied along the cutting path. A particular application of the invention is for Swiss lathe, e.g., a Swiss-type screw cutting machine, that cuts screw threads in screw blank rods, such that the threads have a variable cant along the length of the screw. The invention is not limited to the manufacture of screws, and has broad applicability to machining operations in which a variably canted surface in a workpiece is desired.

2. Description of the Prior Art

Prior Swiss-type lathes are not capable of cutting a helical groove in a metal surface, where the pitch of one or both of the groove walls is continuously varied during the cutting process. Swiss lathes of the type that preceded the present invention are used to machine metal devices from cylindrical rod stock. In a Swiss-type lathe, the chuck holds the cylindrical rod stock and moves the rod stock in a reciprocal and rotating manner. The chuck is generally behind the work area for the Swiss lathe, and near the work area the lathe has a collar to provide a steady-rest for the work area. The cutting tools of a Swiss-type lathe do not move longitudinally, but instead the lathe reciprocally moves the work piece. These Swiss lathes have a rotating chuck that turns the rod stock during the cutting process. The chuck also moves the rod stock laterally forward during the cutting process, and retracts the rod stock when the cutting tool is removed. As the lathe rotates the rod stock and/or moving the stock laterally, a cutting die mounted on the machine is brought into engagement with the rod stock to make a desired cut in the metal. A steady rest collar attached to the lathe supports the rod stock at a region of the stock proximate to the cutting operation.

The cutting tools associated with prior machines were primarily fixed dies, e.g., stick tools, that were mounted in tool brackets. These fixed dies were not moved while they are cutting into the rotating rod stock. With these fixed dies, the rod stock moved during the cutting operation, and the cutting die remained stationary. Certain specialty cutting tools have also been used with Swiss lathes, such as rotating drill bits and groove cutters, e.g. signal point carbide cutting tools. With drills, the rod stock was held stationary and the drill rotates to cuts a hole in the rod stock that is coaxial to the rotation of the drill bit. A groove cutter is similar to a drill bit, in that rapidly rotates 360° about the axis of the cutter, but instead of forming a cylindrical hole as does a drill bit, the groove cutter forms a groove in the cutting stock. These prior art cutting dies, bits and cutters are not capable of making a cut in a rotating rod stock, where the pitch of the cut varies along the length of the cut.

There has been a long-felt need in the prior art for a metal cutting tool that can cut a helical groove in a rod stock, where the walls of the groove are variably canted. In 1990, a novel screw was developed having threads with variably canted surfaces. This novel screw is described in U.S. Pat. No. 5,492,442, and other related patents. When the screw was first developed, it could be machined by hand or by casting. Later, one of the inventors of the present invention, Mr. Andrew Pakos, developed a pivotable guide plate to hold a conventional lathe cutting tool to cut screws having variably canted threads. See U.S. Pat. No. 5,221,234. The guide plate has a armature that is pivoted by a cam mounted on the lathe. The guide plate is limited to conventional lathe applications and is not suitable for a Swiss-type lathes, such as used with the present invention.

SUMMARY OF THE INVENTION

A metal cutting machine and method has been developed to cut a screw thread having variable canted thread surfaces. The machine is adapted to cut in three axis, with the cutting stock rotating about a first axis and the cutting tool pivoting about a fixed point in another axis. The machine has a cutting stick tool that pivots about a cutting point, as the tool cuts a helical thread groove in a rotating rod stock. The pivoting cutting tool is not limited to machining screws having a variably canted thread. The pivoting cutting tool may be used to machine a rotating rod or cylinder, where a variable cant is desired to the surface being machined.

The machine according to one embodiment of the invention is a modified Swiss screw machine that includes: (1) a rotating chuck for holding a rod stock to be machined, wherein the chuck moves the rod stock reciprocally in a direction coaxial to an axis of the rod stock; (2) a cutting tool aligned to cut metal from the rod stock as the stock is rotated and moved laterally by the chuck, and the tool forms a pitch angle with a surface being cut in the rod stock by the tool, and (3) a pivoting cutting tool holder having a bracket holding the tool cutting the rod stock, wherein the tool holder pivots the cutting tool about a cutting point as the tool cuts the rod stock to vary the pitch angle.

BRIEF DESCRIPTION OF THE DRAWINGS

FIG. 3 is a perspective view of a second embodiment of a pivoting cutting tool;

FIG. 4 is a side view of an exemplary cutting tip;

FIG. 5 is a side view of an enlarged portion of a first pivoting head for an alternative embodiment of the cutting tool;

FIG. 6 is a side view of an enlarged portion of another embodiment pivoting head;

DETAILED DESCRIPTION OF THE DRAWINGS

Figure 1:
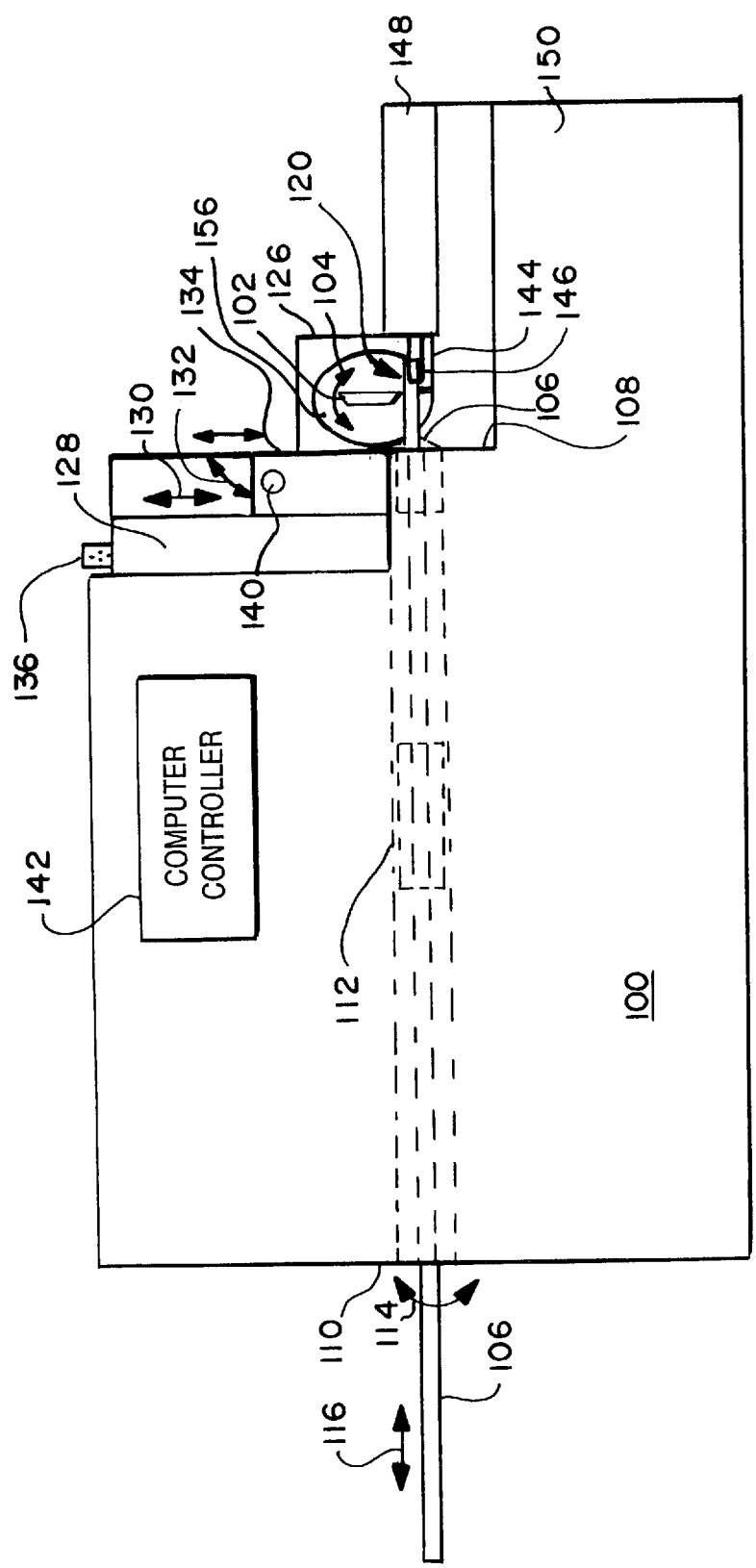
FIG. 1 is a schematic side view of a modified Swiss-type lathe having a first embodiment of a pivoting cutting tool.

FIG. 1 shows in schematic form a side view of a modified Swiss-type screw lathe 100. The Swiss screw lathe has been modified to include, among other things, a cutting tool 102 having a pivoting tool chuck 104 as the tool cuts a metal rod stock 106. The angle at which the pivoting cutting tool cuts against the rod stock varies during the cutting operation.

Swiss screw machines are used to cut screws and other cylindrical objects from stock metal rods 106. The rod stock 106 is generally relatively long and extends from the front face 108 of the Swiss screw machine, and out the back 110 of the machine. The Swiss machine grasps the rod stock with an internal chuck 112, that rotates 114 the rod. In addition, the chuck in the Swiss machine moves the stock laterally 116, such as forward a few inches towards the cutting tool, during machining operations and backwards when the cutting tool disengages from the rod stock. A annular steady rest collar 118 supports the rod stock proximate to the region at which the cutting tool is cutting metal from the stock.

The Swiss screw machine positions the cutting tool 102 to cuts on a front section 120 of the rod stock 106. The Swiss machines moves the cutting tool 102 (and other cutting tools mounted on the Swiss machine) in two planes, both perpendicular to the rod stock. The Swiss screw machine conventionally provides two axes of tool movement, including up and down movement 130 and side-to-side movement 132. A first tool bracket 128 mounted on the front face 108 of the Swiss screw machine provides controlled vertical movement 130 of the cutting tool. A second tool bracket 134 provides controlled horizontal side-to-side 132 movement of the cutting tool. The first bracket 128 is mounted to the front face 108 of the Swiss screw machine by vertical rails and tracks (not shown) that allow the bracket to be accurately positioned vertically with respect to the rod stock. A vertical threaded shaft 136 is rotated under control of a computer controller 142 to precisely position the horizontal movement of the bracket 128 and cutting tools. Similarly, the second tool bracket 134 is mounted to the first bracket 128 by rails and tracks (not shown). A horizontal threaded shaft 140 rotated under control of the computer controller 142 moves the second bracket from side-to-side 132.

The cutting tool 102 is mounted to the second tool bracket 134, such that the cutting tool can be positioned vertically and horizontally by of movement of the tool brackets. The movement of the tool brackets position the tools with respect to the rod stock 106. The movement of the tool brackets, and hence the positioning of the cutting tool, is controlled by a computer controller 142 mounted in the Swiss screw machine.

The computer controller may be, for example, a modified personal computer that activates servo motors to, for example, rotate the threaded shafts 136, 140 to move the brackets 128, 134 and cutting tools in accordance with tooling instructions entered into the computer by an operator. The computer controller may have operator input and output devices, such as a keyboard, and touch-screen display monitor, that allow the operator to program tooling sequences. The operator input and output devices enable the tool operator to enter parameters for cutting tool selection, cutting tool sequence and movement of the cutting tool and stock 106 during the manufacturing operation. An executable, computer-aided machining (CAM) program in the computer controller converts these parameter inputs by the operator into instructions for the servo motors that control the movement of the cutting tool and rod stock.

Figure 2:
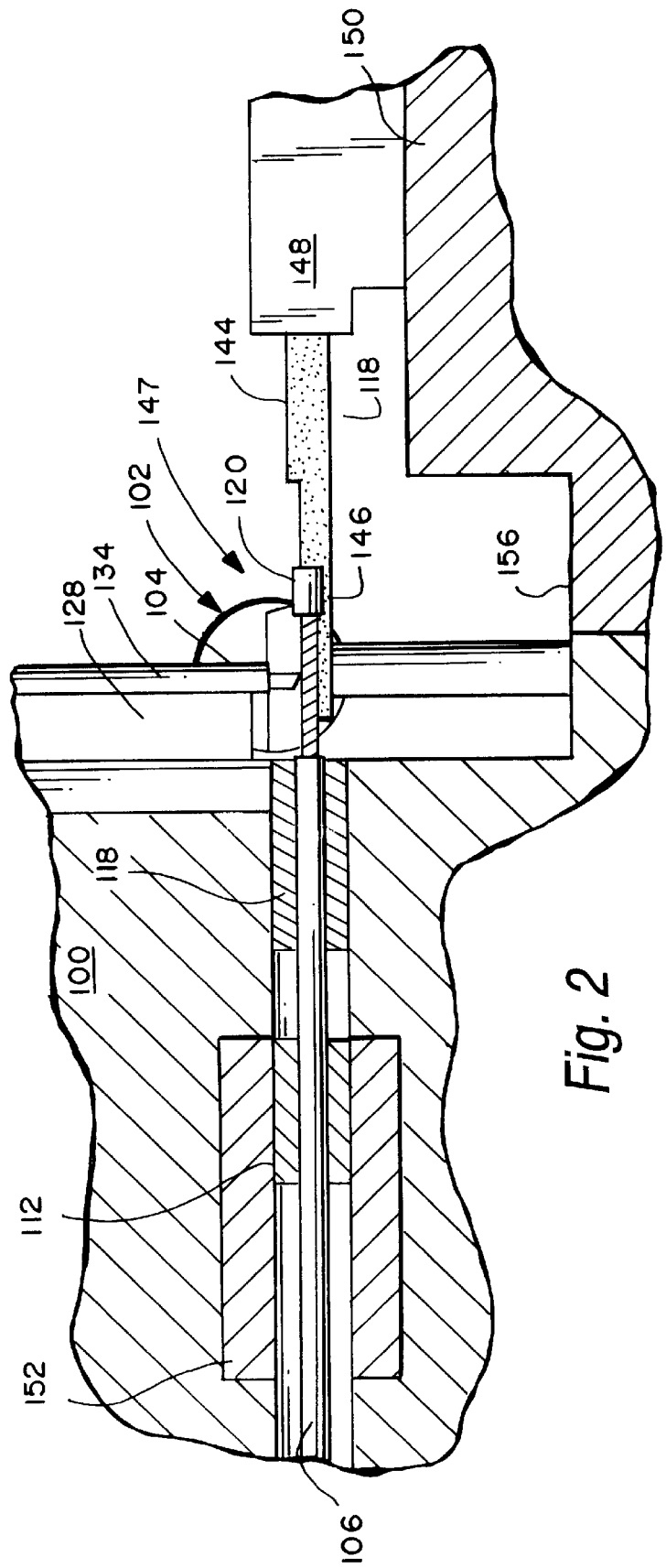
FIG. 2 is an enlarged cross-sectional view of segment A of FIG. 1, to show a portion of the modified Swiss-type lathe.
Figure 7:
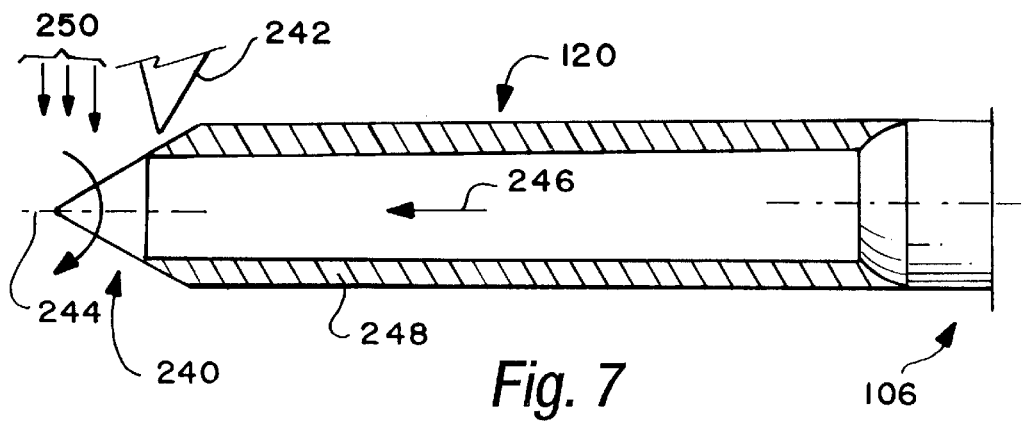
FIGS. 7 to 10 are schematic diagrams showing side views of rod stock in the process of being cut to form a screw using the Swiss-type lathe shown in FIG. 1.
Figure 8:
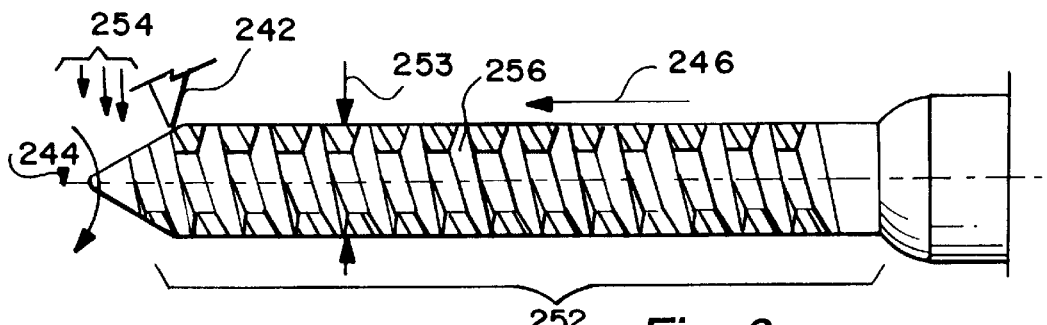

During the metal cutting operation, the front portion 120 of the rod stock 106 is supported in a fixed steady rest saddle 118. As is shown in FIG. 2, the steady rest 118 has is a fixed cantilevered beam or post extending horizontally from a front support of the Swiss machine and towards the cutting region 149 of the machine. The cylindrical post 144 has a groove 146 open at one end to receive the front end 120 of the rod stock. The length of the groove 146 is sufficient to support the end of the rod stock as the stock rotates and moves reciprocally during the cutting operation. The steady rest saddle is fixed to a front support 148 at a front end 150 of the Swiss screw machine. The front end of the Swiss machines includes a machining well with oil jets to lubricate and cool the cutting surfaces, and a sink to collect the oil and metal cuttings.

FIG. 2 shows a schematic of a cross-sectional side view of a portion of the modified Swiss screw machine 100. The Swiss screw machine and, in particular, the second tool bracket 134 that supports the cutting tool 102 used to cut the rod stock mounted in the rod stock chuck 112. The rod stock chuck is internal to the Swiss machine and is rotated and moved reciprocally by a drive mechanism 152. The steady rest collar 118 supports the rod stock on one side of the cutting area 147 and the saddle steady rest 144 supports the rod stock on an opposite side of the cutting area. To provide additional support to the saddle steady rest a column 154 for the saddle steady rest may be located underneath the cutting area 147 and mounted on the bottom of the well 156 of the Swiss machine.

During a cutting operation the Swiss screw machine will, under the guidance of the computer controller 142, engage the pivoting cutting tool 102 with the rod stock 106 in the cutting region 147. The cutting tool is moved into engagement with the stock material by movement of the first 128 and second 134 tool brackets. The computer controller will, for example, move the second bracket 134 side-to-side by rotating the horizontal threaded shaft 140 to position the selected cutting tool into engagement with the rod stock. Similarly, a vertical threaded shaft 136 is rotated by the computer controller to move the first tool bracket 128 up and down to position a selected cutting tool into engagement with the rod stock material 106.

As shown in FIG. 3, the pivoting cutting tool 102 includes a fixed casing 157 that is attached to the second bracket 134 of the Swiss screw machine. A rotatable servo-motor 159 at a rear of the casing 157 provides controlled rotation of a tool chuck 104 at the opposite front end of the casing. The chuck releasably grasps the pivoting cutting stick tool 161. The stick tool includes a carbide tipped cutting surface 160 that cuts the rod stock. The servo-motor 159 rotates the tool chuck 104 about a center line axis 158. The cutting surface 160 of the cutting tool is aligned with the center line axis 158 of the pivoting cutting tool 102.

Pivoting the cutting tool tip 160 about the center line 158 is advantageous because the cutting die tip movement is limited to pivoting about a central point on the cutting surface of the rod stock. If the cutting tip 160 is off the axis 158 of rotation, then the cutting tip will orbit the axis, as well as tilt. The orbital motion will tend to move the cutting tip away from the rod stock, unless the cutting tip is moved to adjust for the orbital movement.

The complexities associated by adding a substantial orbital movement to the cutting tip 160 in addition to a pivoting movement, would necessarily complicate the control needed for the cutting process. To adjust for orbital movement, as the computer controller would have to continually adjust the first and second tool brackets to position the tool tip 160 against the intended cutting location of the rod stock as the tip orbits. While there may be applications where an orbiting tool tip is desired, it is intended that the tip 160 will be aligned with the center line 158 to prevent orbital movement and to limit the tip movement to pivoting while metal cutting takes place.

FIG. 3 shows a perspective view of a schematic diagram that isolates the pivoting cutting tool 102 and rod stock 106, to illustrate the directions of linear and angular movement that are provided by the cutting tool. Typically, the rod stock 106 is rotated and/or moved longitudinally to effect metal removal by the cutting surface 160 of the stick tool. A first angle of movement is the reciprocal, longitudinal movement of the rod stock 106 that moves back and forth in direction 116. By longitudinally moving the rod stock by, for example, up to four inches, a longitudinal cut may be made in the rod with the cutting surface 160 of the cutting tool 102. By rotating the rod stock (without any longitudinal movement), the cutting tool 102 will cut a ring groove in the rod stock. By both rotating 114 and longitudinally moving 116 the rod stock 104, the cutting tool 102 can be used to form a screw thread in the rod stock 106.

In addition to moving the rod stock during a cutting operation, the cutting surface 160 of the cutting tool 102 pivots about an axis 115 to vary the pitch of the surface being cut in the rod stock 106. The plane in which the die tip 160 pivots is perpendicular to the plane of rotation of the rod stock, and parallel to the axis of the rod stock. As the cutting tool tip engages the rod stock, a cutting surface 162 is formed as the tool cutting surface removes metal from the rod. This cutting surface has a pitch angle that is the angle 163 of the cutting surface 160 of the tool 102. By pivoting the cutting tool 102 as the rod stock is moved forward, the pitch of the cutting surface 160 varies to change the angle of the cutting surface 162 formed in the rod stock.

The servo 159 rotates the cutting die tip to change the pitch angle of the cutting surface 160. The pitch angle may be held constant to form a constant angle of the cutting surface. Alternatively, by changing the pitch angle of the cutting tool 102, the slope (pitch 163) of the cutting surface 162 being cut into the rod stock can be varied along the length of the cut made in the rod stock to form, for example, screw heads.

In addition to pivoting 104 the cutting tool tooth 102, the position of the tool can be adjusted either vertically or horizontally 130, 132 by moving the first or second tool brackets 128, 134. The up and down and sideways motions of the tool brackets are used to position the cutting tool 102 into alignment with the rod stock 106 before the actual metal cutting operation occurs. In addition, small vertical (or horizontal movements) may occur to, for example, increase the depth of the cut taken by the tool tip in the rod stock.

A side view of an embodiment of a carbide cutting tip 164 for the cutting stick tool 102. The cutting tip has a cutting surface 166 having a point 168 that is to remove metal from the rod stock. The cutting tip 164 has an end 170 that is held, e.g., by a screw thread mount, in a mount 172 of the cutting tool 172.

FIG. 5 shows an alternative embodiment of a rotating cutting tool 174 that is removable from the casing 157 and servo 195. A chuck 190 engages the servo-motor 195 and to mount the cutting head to the casing 182. The cutting tool 174 rotates about a pivot point 175 aligned with the cutting surface of the cutting tool.

FIG. 6 shows another alternative turning head 192 having a cutting tool die tip 194 that is aligned with the rotational axis 184 of the cutting tool. To use the cutting head 192, the casing 182 of the pivoting cutting tool is reoriented to align the center line 184 with the axis of the rod stock, such that the center line 184 and cutting tip 194 intersect the center line of the rod stock, or intersect with a location slightly offset from the center line of the rod stock and aligned with the cutting location on the rod stock.

Figure 9:
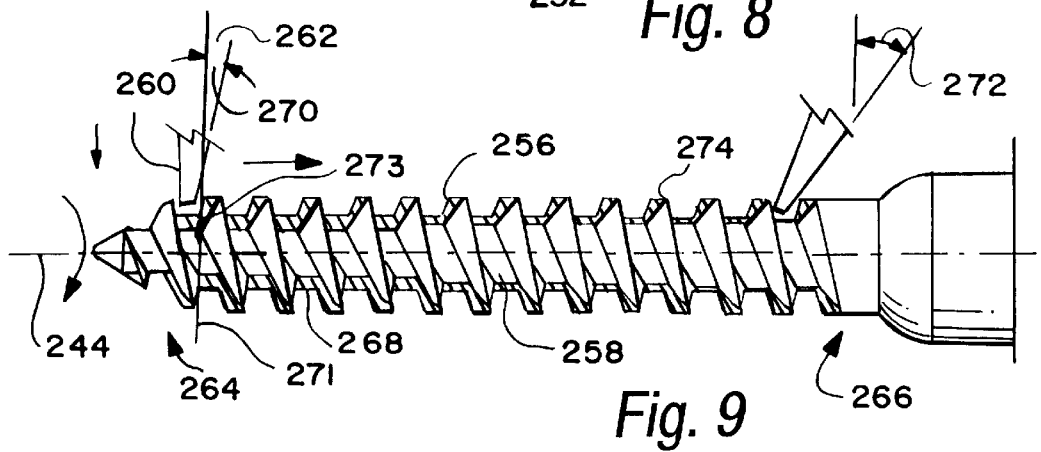

FIGS. 9, 10, 11 and 12 show process steps used in cutting a screw thread having a variably-canted thread surface. FIG. 9 shows a front portion 120 of the rod stock 106, after the rod stock has been tapered at its tip 240 by the lathe 100. The cutting tool die 242 (which may be a pivoting cutting die 102 or a fixed cutting die 122) is used to neck down the outside diameter of the rod stock to the desired outside diameter of the screw threads. The cross-hatched section of FIG. 9 shows the metal area to be removed by the cutting die 242 in the step shown in that figure. The rod stock rotates about axis 244 during the cutting operation. In addition, the rod stock moves longitudinally along axis 244 in direction 246 to cause the cutting tip 242 to remove metal from the cross-hatched area 248 of the rod stock. The depth 250 at which the cutting die tip 242 is positioned is established by the controlled positioning of the second tool holder bracket 134. As shown in FIG. 9 at depth 250, the cutting die tip 242 is sequentially advanced to deeper cutting depths in the rod stock, as successive layers of metal from the rod stock.

Figure 10:
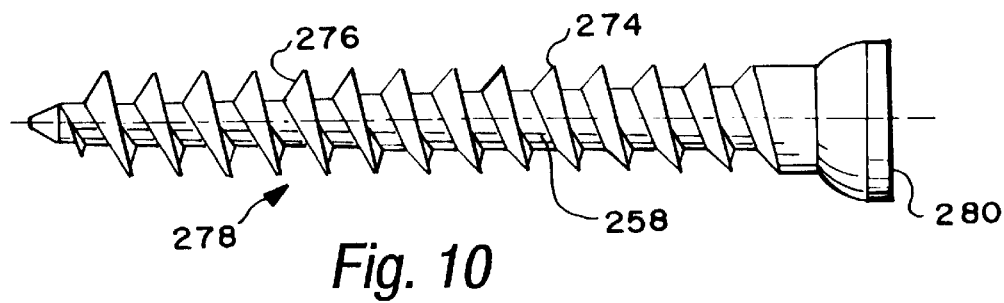

As shown in FIG. 10, once the outer diameter of the thread portion 252 of the screw being formed is reduced to the desired outside diameter of the thread tip 253, the cutting die tip 242 is used to make a rough cut of the threads 256. The cross-hatched section shown in FIG. 10 signify the metal to be removed for the rough cut of the screw threads. The cutting die tip 242 is moved in a relative helical motion to cut a helical groove 268 between the screw thread 256. The groove 268 is cut with the die 260 by both rotating the rod stock about axis 244, and moving the rod stock in direction 246 such that the cutting die tip 260 follows the helical groove 268 to be cut between the screw threads. The cutting die tip is moved to make successively deeper cuts 254 in the rod stock, with each cut removing the metal area marked by the cross-hatching in FIG. 10. During the rough cutting of the threads, the cutting die tip 242 is not pivoted. Instead, the cutting die tip is held at a fixed relative angle to the axis 244 of the rod stock. Accordingly, the die may be a conventional cutting die 122.

FIG. 11 shows a screw with rough cut threads 256. The rough threads are blunt and have a constant surface pitch angle. In addition, the core 258 of the screw has a constant diameter. The pivoting cutting tip 260 is used to taper the core and variably cant the thread surface by removing the cross-hatch areas of the rough cut threads 256. The pitch angle 262 may be changed from a narrow, near vertical angle 270, e.g., 2°, to a wider angle, e.g., 4°, at 272, to form a screw having a tapered core and sharp threads. The initial pitch angle may be set with respect to the angle between the tip 260 and an imaginary plane 271 through a set point 273 at the root of the first turn of the screw thread. Based on the initial pitch angle as correlated to the set point 273 on the screw, the computer controller 142 can pivot the pitch angle of the die tool as a function of the distance from the set point to the die tool along the length of the screw.

FIG. 12 shows a fully machined screw cut from rod stock using the modified Swiss-type screw machine 100 with a pivoting turning head 152. The unique characteristics of a screw machine with this cutting process includes a tapered core 158, sharpened thread tips 274, and a variably canted angle of the bottom surface of the threads 276. Also, the screw 278 shown in FIG. 12 has been cut off at its head 280 from the rod stock to form a finished screw. Additional machining operations, such as cutting a hex end or slot in the head 280 of the screw, can be performed using conventional means. The pivoting cutting tool can be used to variably cant either or both top and bottom surfaces of the screw threads. The pivoting cutting die is generally applicable to cutting metal a variable pitch angle to form metal surfaces having variable angles of cant.

The invention has been described in connection with what is presently considered to be the most practical and preferred embodiment. The invention is not limited to the disclosed embodiment, but covers the various modifications and equivalent arrangements included within the spirit and scope of the appended claims.

What is claimed is:

1. A metal cutting machine comprising:

a rotating chuck for holding a rod stock to be machined, wherein the chuck moves the rod stock reciprocally in a direction coaxial to an axis of the rod stock;

a cutting tool die aligned to cut metal from the rod stock as the stock is rotated and moved reciprocally by the chuck, and the tool die forming a pitch angle with a surface being cut in the rod stock by the tool die;

a pivoting cutting tool holder having a bracket holding the tool die cutting the rod stock, wherein the tool holder pivots the tool die as the die cuts the rod stock to vary the pitch angle.

2. A metal cutting machine as in claim 1 wherein the pivoting cutting tool holder pivots the tool die about an axis through a cutting surface on the die, where the cutting surface is engaged with the rod stock.

3. A metal cutting machine as in claim 1 wherein the pivoting cutting tool holder comprises:

a casing attached to a movable tool bracket, where the tool bracket moves vertically and horizontally with respect to the casing;

a servo motor mounted to the casing;

a cutting tool head rotatably mounted to the casing and rotatably coupled to the servo motor, such that the motor pivots the cutting tool head, and wherein the cutting tool head holds the bracket for the cutting tool die.

4. A metal cutting machine as in claim 1 wherein the pivoting cutting tool holder comprises:

an armature attached to a movable tool bracket, where the tool bracket moves vertically and horizontally with respect to a stationary casing of the metal cutting the machine;

a servo motor mounted to the armature, and a reciprocal shaft actuated by the servo motor;

a cutting tool head rotatably mounted to the armature and having a cam surface engaged with the reciprocal shaft and the tool die bracket, wherein reciprocal movement of the shaft against the cam surface pivots the cutting tool head about a bearing axis between the tool head and armature;

the cutting tool die held in the bracket pivots with the cutting tool head.

5. A metal cutting machine as in claim 4 wherein the bearing axis between the tool head and armature is aligned with a cutting surface of the tool die.

* * * * *